United States Patent [19]

Coffey

[11] Patent Number: 5,253,592

[45] Date of Patent: Oct. 19, 1993

[54] MAGNETIC LEVITATION CONFIGURATION INCORPORATING LEVITATION, GUIDANCE AND LINEAR SYNCHRONOUS MOTOR

[75] Inventor: Howard T. Coffey, Darien, Ill.

[73] Assignee: The United States of America as represented by the United States Department of Energy, Washington, D.C.

[21] Appl. No.: 920,737

[22] Filed: Jul. 28, 1992

[51] Int. Cl.$^5$ ............................................. B60L 13/04
[52] U.S. Cl. ........................................ 104/281; 104/286
[58] Field of Search .............. 104/145, 140, 142, 139, 104/281, 282, 283, 284, 286, 290, 292, 293, 294

[56] References Cited

U.S. PATENT DOCUMENTS 3,470,828 10/1969 Powell et al. ..................... 104/285
3,892,185 7/1975 Guderjahn ........................ 104/286
4,408,139 10/1983 Schwarzler ....................... 104/290

Primary Examiner—Mark T. Le
Attorney, Agent, or Firm—Bradley W. Smith; John M. Albrecht; William R. Moser

[57] ABSTRACT

A propulsion and suspension system for an inductive repulsion type magnetically levitated vehicle which is propelled and suspended by a system which includes propulsion windings which form a linear synchronous motor and conductive guideways, adjacent to the propulsion windings, where both combine to partially encircling the vehicle-borne superconducting magnets. A three phase power source is used with the linear synchronous motor to produce a traveling magnetic wave which in conjunction with the magnets propel the vehicle. The conductive guideway combines with the superconducting magnets to provide for vehicle leviation.

5 Claims, 2 Drawing Sheets

MAGNETIC LEVITATION CONFIGURATION INCORPORATING LEVITATION, GUIDANCE AND LINEAR SYNCHRONOUS MOTOR

CONTRACTUAL ORIGIN OF THE INVENTION

The United States Government has rights in this invention pursuant to Contract No. W-31-109-ENG-38 between the U.S. Department of Energy and the University of Chicago.

BACKGROUND OF THE INVENTION

This invention relates to a propulsion and suspension system for an inductive repulsion type, magnetically levitated vehicle, and more specifically, to a magnetically levitated ("maglev") vehicle which is propelled and suspended by a system which includes propulsion windings partially encircling the vehicle-borne suspension magnets.

Maglev development began more than two decades ago in the United States, Germany, Japan, Canada and England. In the United States, renewed interest has been directed toward magnetic levitation transportation systems in view of such factors as energy conservation, high speed transportation at ground level, economic and environmental problems associated with conventional systems, and competition from West Germany, and Japan.

The use of an electrodynamic suspension to provide levitation in maglev systems is well known in the prior art (see further, U.S. Pat. No. 3,470,828, issued Oct. 7, 1969, to Powell et al). A repulsive levitation (suspension) force is generated by the interaction between a rapidly changing magnetic field generated by superconducting magnets aboard the moving vehicle and eddy currents induced in the guideway. The guideway can be made of a continuous sheet of a non-magnetic conductor, such as aluminum, or of discrete coils, loops or slotted hollow tubular type structures of similar material.

The use of a linear synchronous motor (LSM) to propel a wheeled or levitated vehicle is also well known in the prior art (see further, Rhodes et al., "Magnetic Levitation for Rail Transport", 1981, pages 62–67), and several systems include a linear synchronous motor with electrodynamic repulsion system to provide propulsion by magnetic means (see further, U.S. Pat. No. 3,815,511, issued Jun. 11, 1974, to Dukowicz et al).

The Japanese MLU-002 electrodynamic suspension system is one of the most highly developed systems of this type in the world. Superconducting magnets on the vehicle react against conventional, normally conducting, coils in the guideway. In early tests, the superconducting magnets were placed in a horizontal position and reacted against horizontal coils on the bottom of the guideway. The superconducting magnets were later redesigned and located vertically, reacting with horizontal coils on the guideway for levitation and vertical coils located on the sidewalls of the guideway for guidance. The guidance coils are connected in a null-flux configuration to reduce the electromagnetic drag. Linear synchronous propulsion coils are also located on the sidewalls, but since they are symmetrically located with respect to the null-flux coils, they do not interact with them.

The basic components of the present magnetically levitated vehicle system have been identified and are well understood (see further, "Preliminary Design for a Maglev Development Facility", ANL/ESD-14). It is the object of this invention to devise a configuration of those components which will achieve the highest synergy, that is, which will minimize the negative effects and maximize the positive effects of one component on the others.

The present invention departs from the prior art principally in its configuration of the windings for the linear synchronous motor (LSM), in the use of multiple superconducting magnets to achieve better field profiles for propulsion, levitation, and guidance, and in its guideway configuration. In the prior art, the LSM coils were placed in the roadbed below or beside the superconducting magnets mounted on the vehicle. In some designs, these superconducting magnets were separated from the levitation magnets. The present invention uses a conductive guideway and LSM stator, both of which are shaped in the form of a slotted, tubular structure, to interact with a series of magnets on the vehicle to achieve levitation, guidance, and propulsion. The conductive guideway and the LSM are housed in the hollow, cylindrical core of the guideway structure. The guideway structure is part of the general support structure. A series of superconducting magnets located interior to the LSM and conducting guideway are connected to the vehicle by means of support members extending through the aligned, longitudinal slot of the LSM, conductive guideway, and the guideway. The longitudinal slot may be oriented in any preferred direction. The LSM includes a series of windings which are supplied with three phase AC electrical power to produce a traveling magnetic wave along the tubular axis of the guideway which interacts with the series of magnets attached to the vehicle to generate the propulsive force.

Since the self forces tend to expand a current carrying coil, it is easier to construct superconducting magnets having circular cross sections since the forces are constrained by the conductor coils.

The current in the series of superconducting magnets attached to the vehicle can be varied from magnet to magnet to alter the magnitude or polarity of the magnetic fields to achieve different objectives. If the same polarity is used in all of the magnets, the magnetic field will balloon out in the gaps between the magnets. Moving a series of magnets inside a stationary conducting tube and along the common axis, eddy currents will be induced in the conducting tube by the varying magnetic field. The magnetic field generated by these eddy currents will cause the magnets to be repelled from the tube, thereby centering the series of magnets along the axis of the tube. By adjusting the currents in each of the magnets, their lengths, their inside and outside diameters, as well as the spacing between the magnets, the profile of the magnetic fields experienced by the conducting tube can be altered to achieve the best repulsive force for levitation and guidance while experiencing the least electromagnetic power dissipation. Further, by altering these parameters, the axial and radial components of the magnetic fields outside the series of magnets can be varied. An axial force can be generated in this structure by encircling it with an array of slotted, hollow cylindrical coils to form three windings of different AC phases and energized by a three-phase power source to generate an axially directed traveling magnetic wave. When the objective is to provide the maximum propulsive force, the radial component of the magnetic field should be maximized. By energizing the magnets so alternate coils have opposite polarities, the field profile emphasizes the radial component of the field. Such structures can be used to produce either leviation and guidance forces or propulsion, levitation and guidance forces combined. Using these methods, the conductive guideway can be constructed with slotted, tubular sections for levitation and LSM coil sections for propulsion. These sections are alternated so that some of the magnets attached to the vehicle are in each section at all times. Generally, the propulsion coils would form a complete circle; however, since a slot is required for the support structures connecting the vehicle to the superconducting magnets, the LSM winding must allow for this. As indicated previously, the slot through which the vehicle is connected to the superconducting magnets can be located along any plane within the tubular structure.

The LSM windings are arranged so that alternating individual coils are wound in opposing directions using a continuous section of conductor; this allows for the formation of the slot in the completed solenoid coil. Since the windings are in opposition, the inductance is small, an asset when the winding is long since the reactive impedance and therefore the voltage required is minimized. The current between circular sections is primarily parallel to the magnetic field and results in little or no force. Since the magnetic fields alternate in polarity, the magnetic field decreases rapidly with distance from the magnets. The shielding currents induced in the guideway will also reduce the stray fields.

The slotted cylinder configuration of the present invention enhances the shielding from the magnetic field for the passengers and provides a protective enclosure for the guideway interior.

In addition, the invention provides for flexibility in adjusting the magnetic field profile resulting from the series of superconducting magnets to maximize propulsion or levitation or guidance.

In addition, the invention minimizes the reactive impedance, thus, lowering the power required and, therefore, the cost.

Additional advantages, objects and novel features of the invention will become apparent to those skilled in the art upon examination of the following and by practice of the invention.

SUMMARY OF THE INVENTION

To achieve the foregoing and other advantages, this invention comprises a propulsion and suspension system for an inductive repulsion type magnetically levitated vehicle which includes coils or propulsion windings of a linear synchronous motor which are part of the vehicle guideway which form a cylindrical enclosure for the superconducting magnets which are attached to the magnetically levitated vehicle.

BRIEF DESCRIPTION OF THE DRAWINGS

The present invention is illustrated in the accompanying drawings where.

DETAILED DESCRIPTION OF THE INVENTION

Figure 1:
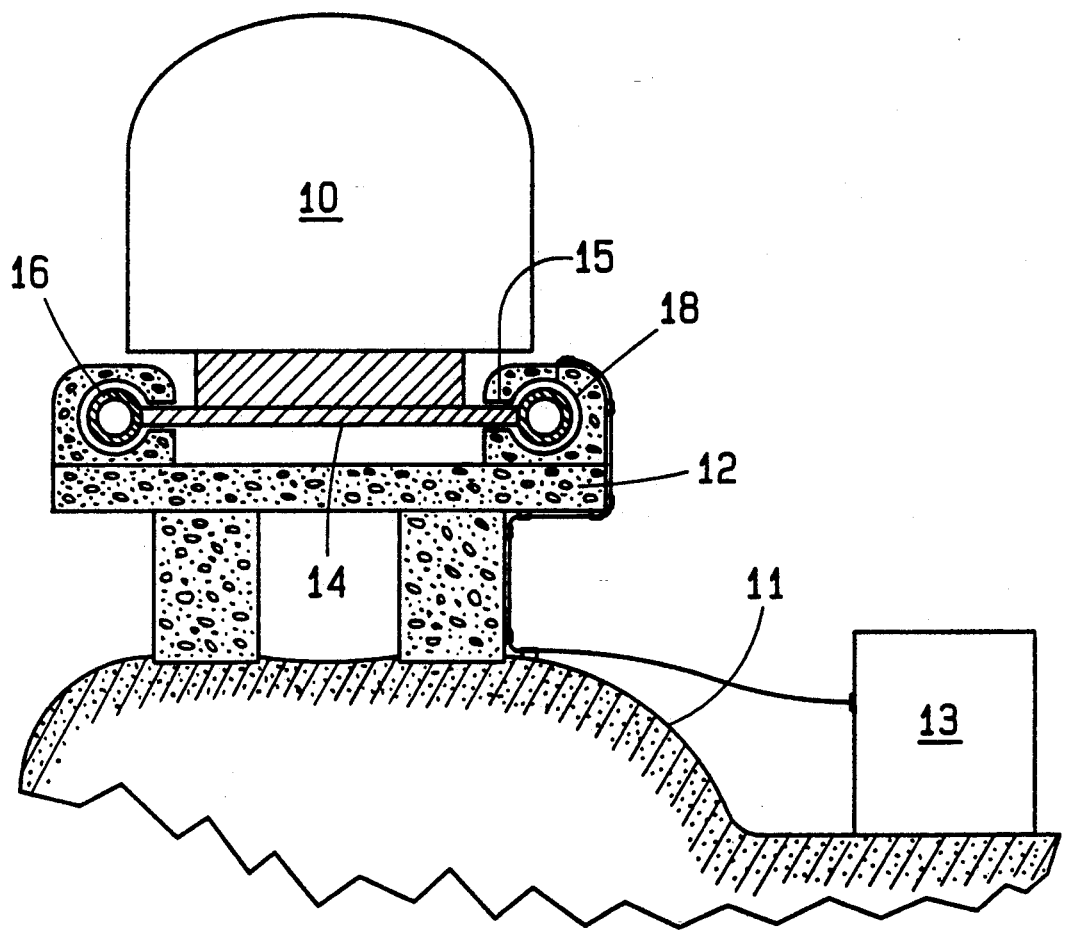
FIG. 1 is a schematic cross-section of the maglev vehicle and its electrodynamic levitation and propulsion systems of the present invention.

In the schematic cross-section of FIG. 1, vehicle 10 and its undercarriage 14 are levitated and propelled by electrodynamic systems included within support structure 12. Support structure 12 which is anchored to roadbed 11 includes beams and piers constructed of concrete or similar material partially enclosing undercarriage 14 and supporting the electrodynamic systems associated with the support structure 12. The undercarriage 14 is connected to magnet 16 through a longitudinal slot 15 in the guideway 18. As shown in FIG. 1, support structure 12 may also include means for elevation, to avoid grade crossings as well as for safety and other reasons. The power source 13 is distinct from the support structure 12 and the roadbed 11.

Figure 2:
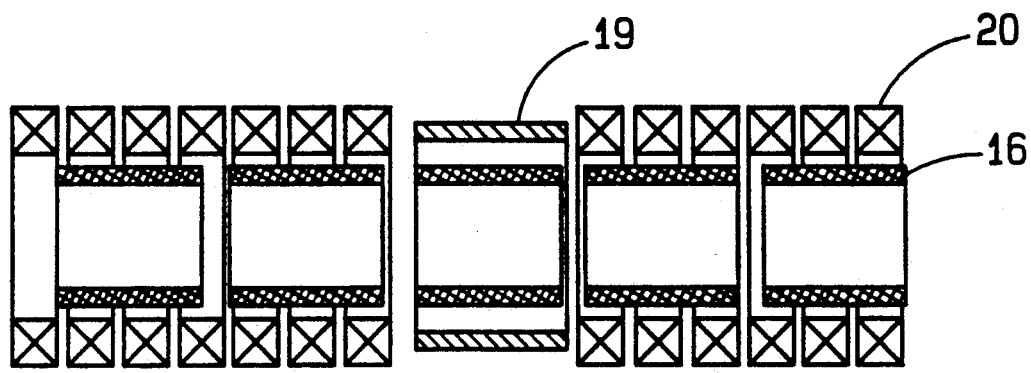
FIG. 2 is schematic perspective view showing the relative positions of a guideway, magnet and LSM of the present invention.

The relative positions of a magnet 16 and components of the guideway 18, a conductive guideway 19 and a linear synchronous motor 20, are depicted in greater detail in the schematic perspective view of FIG. 2., which depicts one of two mirror-image structures on either side of vehicle 10. A plurality of magnets 16 attached to undercarriage 14 are enclosed by a tubular structure made up of alternating hollow cylindrical segments comprising a conductive guideway 19 and linear synchronous motor 20. Linear sychronous motor 20 and conductive guideway 19 are attached to the inner surface of the guideway 18 which is integrated into support structure 12 as depicted in FIG. 1. As depicted in FIG. 1 both magnet 16 and linear synchronous motor 20 are parallel to each other and approximately parallel to the ground; those skilled in the art will recognize that alternate configurations may be included in this invention.

Magnets 16 are comprised of current-carrying superconducting coils enclosed in Dewar structures (not shown) and maintained at cryogenic temperatures using appropriate refrigeration equipment (not shown). In the alternative, magnets 16 comprise permanent magnets.

In the preferred embodiment, conductive guideway 19 is comprised of slotted, tubular sections constructed of a conductive, non-ferromagnetic metal such as aluminum. The slot in the guideway may be oriented in any preferred direction.

In the preferred embodiment linear synchronous motor 20 is comprised of 3-phase windings which are known in the prior art, and capable of producing a traveling magnetic wave along the guideway 18.

When vehicle 10 (not shown) is in motion, a repulsive force is created between the magnet 16 and conductive guideway 19 by the interaction of the magnet and eddy currents induced in the conductive guideway 19 by the time varying magnet field of the passing magnet. This repulsive force levitates magnets 16 and undercarriage 14 to maintain the vertical position of the vehicle. Since guideway 18 is "C"-shaped, repulsive forces also serve to guide vehicle 10 laterally as well; thus, the electromagnetic interaction of the magnet 16 with the conductive guideway 19 positions the vehicle both laterally and vertically providing for total planar control of the vehicle 10. Simultaneously, the interaction between a magnetic field of magnets 16 and a magnetic field of windings in LSM 20 produces a propulsion force, moving vehicle 10 in the direction of the traveling-wave.

Figure 3:
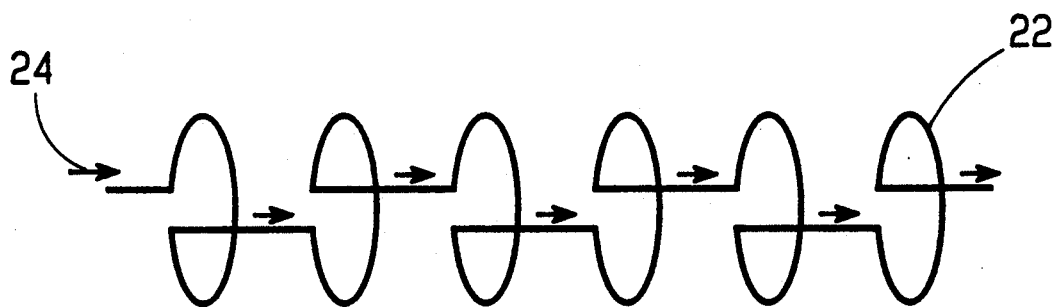
FIG. 3 is a schematic of a system of winding the three phase propulsion coils to account for the slot in the cylindrical coil.

In FIG. 3, a single phase winding arrangement 22 of the LSM 20 allows for an open slot to permit mechanical access to the coils and to allow for the support bracket connecting the magnet 16 to the vehicle 10. Application of an imposed current 24 in the direction shown results in a reversing magnetic field for a single phase.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiments described explain the principles of the invention and practical applications and should enable others skilled in the art to utilize the invention in various embodiments and with various modifications as are suited to the particular use contemplated. It is intended that the scope of the invention be defined by the claims appended hereto.

The embodiment of this invention in which an exclusive property or privilege is claimed is defined as follows:

1. A magnetic levitation and propulsion system for a vehicle adapted to travel over a roadbed comprising:
   a pair of slotted guideways where each guideway of said pair has a hollow, cylindrical interior surface where said guideway is imbedded in a support structure and where said support structure is coupled to the roadbed,
   a plurality of conducting guideways affixed to said interior surface of said guideway where said conducting guideway has a longitudinal slot running the length of the conductive guideway,
   a plurality of propulsion windings affixed to said interior surface of said guideway and bordering said conducting guideway, where said propulsion windings form a hollow cylinder having a longitudinal slot running the length of the hollow cylinder where said slot is aligned with the slot in said guideway and where said windings are energized by a power source to create a traveling magnetic wave,
   a plurality of superconducting magnet devices producing a magnetic field and affixed to the vehicle where said superconducting magnet devices are located interior to said plurality of propulsion windings and to said plurality of said conducting guideways, where said superconducting magnets are connected to the vehicle by a support member which traverses said guideway through said slot and where said magnet devices generates a repulsive force between said conductive guideway and where said magnetic devices and interact with said traveling magnetic wave to propel the vehicle along said guideway.

2. The apparatus of claim 1 wherein said conducting guideway comprises a hollow, conducting tube having a longitudinal slot which runs the length of said tube and aligns with the slot in said guideway and is comprised of a non-ferromagnetic material and where said conducting guideway acts to generate a repulsive force both laterally and vertically between said guideway and said magnetic devices.

3. The apparatus of claim 1 wherein said power source provides a current to said propulsion windings and said current is dynamically varying.

4. The apparatus of claim 3 wherein said propulsion windings are wound in such a manner that each successive coil is wound in the opposing direction and where the change in winding direction creates a slotted, hollow cylinder.

5. The apparatus of claim 4 wherein said propulsion windings produce a reduced inductance and required voltage.

* * * * *